Figure 1:
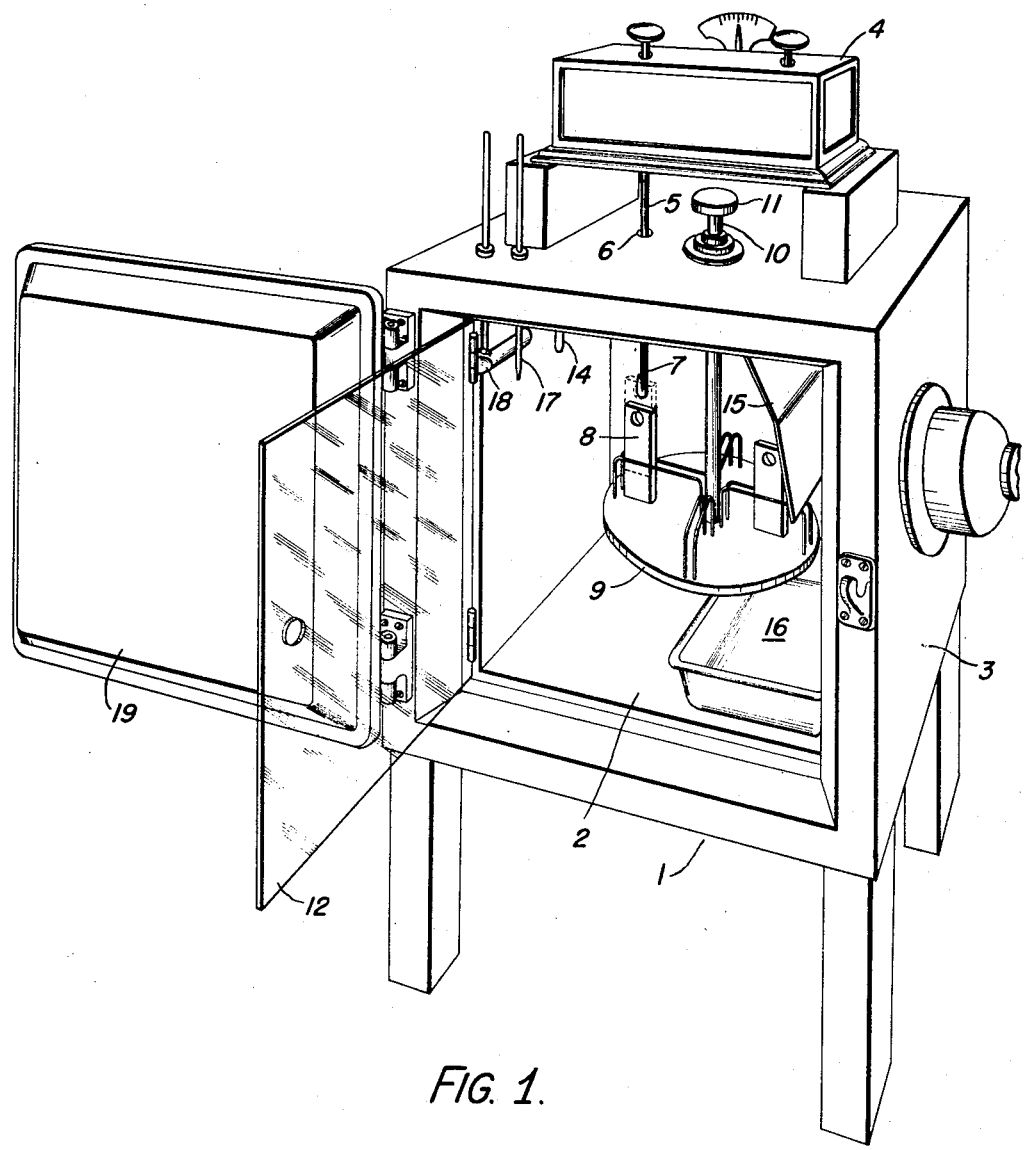

Nov. 13, 1951   H. J. GREEN, JR   2,575,169
METHOD OF DETERMINING THE RATE OF MOISTURE ABSORPTION
Filed Sept. 17, 1948   2 SHEETS—SHEET 2

INVENTOR.
HARRY J. GREEN, JR.
BY
J. L. Bowes
ATTORNEY

Patented Nov. 13, 1951

2,575,169

UNITED STATES PATENT OFFICE 2,575,169

METHOD OF DETERMINING THE RATE OF MOISTURE ABSORPTION

Harry J. Green, Jr., Rochester, N. Y., assignor to Stromberg-Carlson Company, a corporation of New York Application September 17, 1948, Serial No. 49,786

1 Claim. (Cl. 73—73)

My invention relates to improvements in methods of determining the rate of moisture absorption by plastic or fibrous materials.

In many applications it is important to know in advance how much moisture may be absorbed from the air by plastic or fibrous materials because moisture may adversely affect their appearance, dimensions, mechanical strength, or electrical insulating properties, for example. The types of materials so affected include cast and molded resinous products, as well as laminated and homogeneous plastics. In the past, the standard method of determining water absorption has involved the following steps:

First, a sample of the material to be tested is first "conditioned," that is, dried. Second, the sample is weighed. Third, the conditioned sample is placed in a container of distilled water, maintained at a temperature of 25 plus or minus 2° C., for twenty-four hours. Fourth, the sample is removed from the water, and water remaining on the surface is wiped off with a cloth. Fifth, the sample is again weighed. The difference between the first and last weights is the amount of water absorbed over this period. The above procedure is outlined in Standard D570–42, published by the American Society for Testing Materials. This older method is obviously subject to several disadvantages. In the first place, twenty-four hours are required to obtain the information. In the second place, thin samples must be placed in a weighing bottle immediately after wiping to minimize evaporation, but despite this precaution some error in determination may be encountered.

It is accordingly an object of my invention to enable the rate of moisture absorption by a plastic or fibrous material to be determined more rapidly than has been heretofore possible.

It is another object of my invention to enable this determination to be made more precisely than has been possible with previous methods.

Further objects and advantages of my invention will become apparent as the following description proceeds and the features of novelty which characterize my invention will be pointed out with particularity in the claim annexed to and forming a part of this specification.

In general, I accomplish the objects of my invention by providing apparatus in which the amount of moisture absorbed by a sample of plastic or fibrous material may be determined at will at any given time without disturbing the conditions of the test. The test may, therefore, be continued after a determination. In the preferred form of my invention, the apparatus comprises a closed chamber in which a sample of the material to be tested is placed; means for maintaining the air within said chamber homogeneous and at constant temperature and humidity; and means for weighing the sample at will without removing it from the chamber or disturbing the air within the chamber.

By weighing the sample at intervals, and plotting the data thus obtained on graph paper having logarithmic axes, the observer may determine the amount of moisture which will be present at any given time before saturation by extrapolating the straight line produced on the graph.

Figure 2:
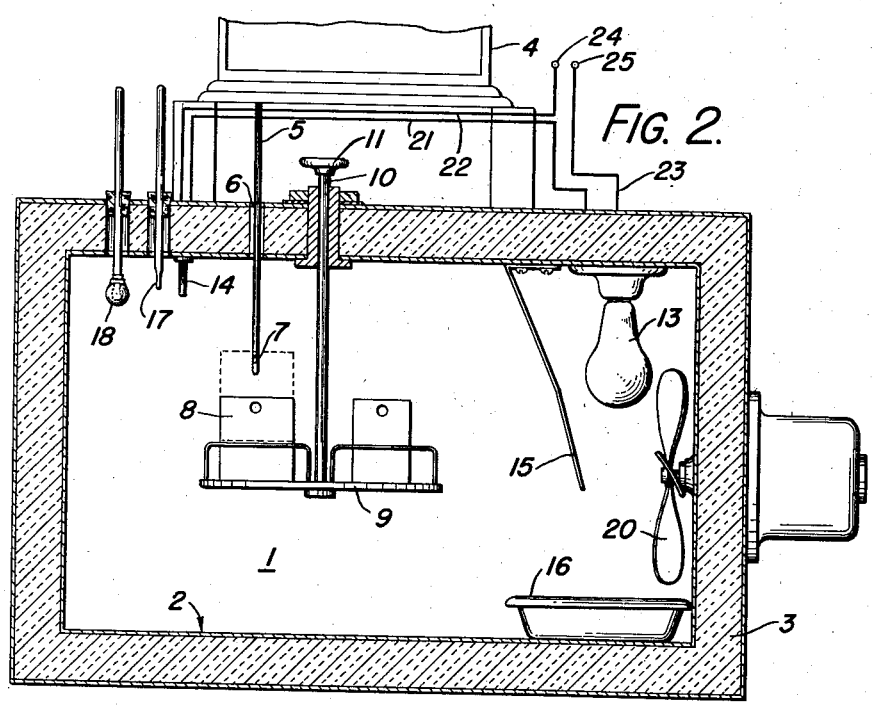
Figure 3:
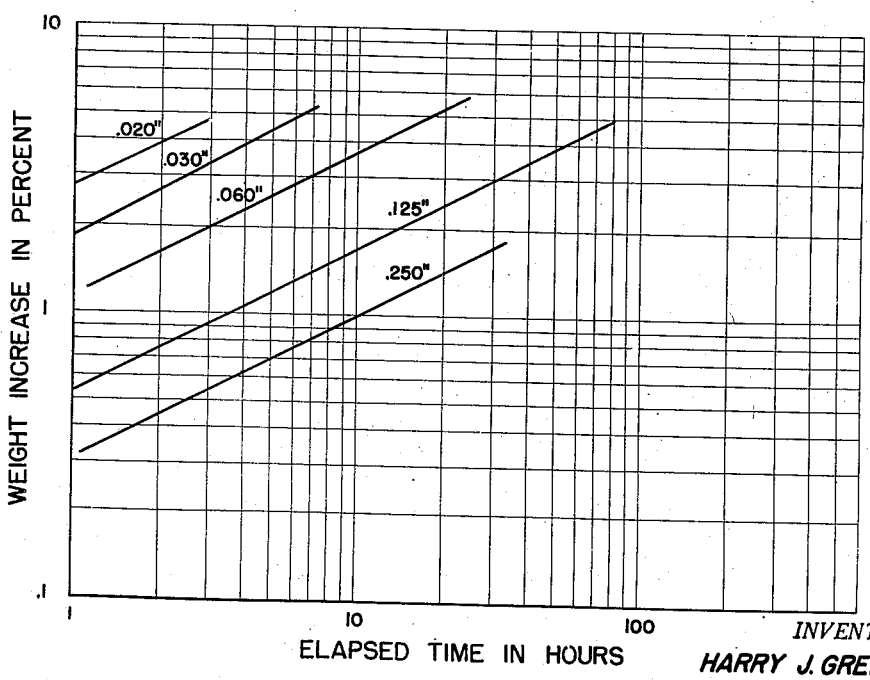

For a better understanding of my invention, reference may be had to the accompanying drawings, in which Fig. 1 is a three-quarter view of one embodiment of apparatus constructed according to my invention, Fig. 2 shows a sectional view of the same embodiment, and Fig. 3 shows a typical graph drawn according to my invention.

The embodiment of the apparatus for use in practicing my invention shown in Figs. 1 and 2 comprises an enclosable chamber 1 having a lining 2 of any suitable material as copper, for example, and insulation 3 in all sides including the outer door 19. The insulation may be a layer about three inches thick of glass wool, sawdust, or the like. A torsion balance 4 is provided with an extension rod 5 passing through a small collar 6 into the interior of the chamber 1. The clearance between extension rod 5 and collar 6 is preferably as small as possible without creating a frictional drag on the weighing system. Extension rod 5 may be provided with a hook 7 for holding a sample 8. If it is desired to conduct tests on more than one sample of a material, or on samples of more than one material, turntable 9 may be provided for lifting samples, one at a time, on and off hook 7 as required. This is accomplished by lifting and rotating turntable 9 by means of rod 10 and knob 11 through the necessary distance. The various samples may be selected by rotating turntable 9 at its lowermost position. A glass door 12 suitably sealed, as by gasket means (not shown), to render chamber 1 substantially airtight enables the operator to perform this manipulation quickly and easily without opening the chamber to the outside air. The door 19 of chamber 1 is kept closed, of course, except when readings are being taken or samples are being manipulated. Lamp 13 and thermostat 14 are connected in series by means of conductors 21, 22, 23 to a source of current indicated by terminals 24, 25.

The condition of the air within the chamber is maintained at constant temperature by a source of heat, such as an incandescent lamp 13 (shown in Fig. 2) of appropriate wattage. The lamp is so controlled, as by means of thermostat 14, that the temperature of the air within the chamber is maintained substantially constant. The samples are protected from direct radiation of heat from source 13 by a shield 15. The humidity inside the chamber is maintained substantially constant, as by means of a saturated solution of a chemical compound 16; for example, a saturated solution of potassium sulphate will maintain the relative humidity at 95 per cent over the temperature range of 30 to 100 degrees centigrade. Other compounds may be used to maintain other values of humidity. The temperature and humidity may be checked by means of a dry bulb thermometer 17 and a wet bulb thermometer 18, the operating ends of which are within the chamber and the scale ends of which are outside the chamber. A fan 20 may be provided to insure that the temperature and humidity of the air within the chamber will be homogeneous throughout.

To employ this apparatus in making a moisture absorption rate determination, the moisture in a sample of the material to be tested is first driven off by heating it in an oven to an appropriate temperature for an appropriate time. The times and temperatures employed may be those specified in the above mentioned publication of the American Society for Testing Materials. The sample is then inserted in the chamber (the humidity and temperature to be employed having already been established in the chamber) and weighed as soon as possible. It is helpful to weigh the sample before the drying-out process is begun, because this enables a preliminary balance to be readily made as soon as the sample is placed in the chamber. The chamber is sealed immediately after inserting the sample by closing glass door 12 and insulated door 9. At intervals after the first weighing, the weight of the sample is re-determined and the resulting data are plotted on graph paper with logarithmic axes, percent increase in weight being plotted as a function of elapsed time. The resulting relationship is a straight line function. (This is illustrated for several samples of different thickness in Fig. 3). The amount of moisture absorbed by the sample can consequently be predicted by extending this line to the desired time abscissa. Inasmuch as two points are sufficient for drawing a straight line, it is apparent that with my method the 24-hour moisture absorption of a sample can be predicted after only a relatively short time. It is, of course, necessary to know that the material undergoing weighing tests is reasonably homogeneous for this relationship to hold true, and also to know that saturation will not occur within such time. Furthermore, if errors due to edge effects are to be avoided, the face dimensions must be considerably greater than the thickness.

While I have shown and described a specific apparatus for use in practicing my invention, other modifications will be readily apparent to those skilled in the art.

What I claim is:

A method of determining the moisture absorbed by a body comprising dehydrating said body, weighing said body in its substantially dehydrated condition, exposing said body to a moist homogeneous atmosphere having substantially constant values of temperature and humidity, weighing said body in said atmosphere at time intervals prior to saturation, and logarithmically coordinating weight increases of said body with elapsed time of exposure whereby the resulting straight line relationship between said weight increases and time provides an indication of the moisture content of the body after any time interval prior to saturation.

HARRY J. GREEN, Jr.

REFERENCES CITED

The following references are of record in the file of this patent:

UNITED STATES PATENTS

| Number | Name | Date |
| --- | --- | --- |
| 648,868 | Hartshorne | May 1, 1900 |
| 1,089,826 | Emerson | Mar. 10, 1914 |
| 1,271,660 | Brunner | July 9, 1918 |
| 1,602,213 | Robbins | Oct. 5, 1926 |
| 1,969,606 | Hall | Aug. 7, 1934 |
| 2,047,765 | Bradener | July 14, 1936 |